United States Patent
Perrotta et al.

[11] Patent Number: 5,334,366
[45] Date of Patent: Aug. 2, 1994

[54] TRANSITION ALUMINA AND METHOD FOR ITS PRODUCTION

[75] Inventors: Anthony J. Perrotta, Monroeville; Randall B. Minnick, Lower Burrell, both of Pa.

[73] Assignee: Aluminum Company of America, Pittsburgh, Pa.

[21] Appl. No.: 1,152

[22] Filed: Jan. 7, 1993

[51] Int. Cl.$^5$ .................................................. C01F 7/02
[52] U.S. Cl. ................................. 423/625; 423/133
[58] Field of Search .................. 423/111, 133, 624, 629

[56] References Cited

U.S. PATENT DOCUMENTS

| | | | |
|---|---|---|---|
| 4,012,337 | 3/1977 | Mitchell | 252/439 |
| 4,169,883 | 10/1979 | Murrell et al. | 423/628 |
| 5,002,910 | 3/1991 | Robyn | 501/103 |
| 5,128,081 | 7/1992 | Siegel et al. | 264/81 |

FOREIGN PATENT DOCUMENTS 127619  6/1986  Japan ........................ 423/625

OTHER PUBLICATIONS

Wefers et al., *Alcoa Technical Paper No. 19*, "Oxides and Hydroxides of Aluminum", 1972 pp. 40–51.

*Primary Examiner*—Gary P. Straub
*Assistant Examiner*—Stephen G. Kalinchak
*Attorney, Agent, or Firm*—Glenn E. Klepac

[57] ABSTRACT

A new transition alumina is made by heating substantially pure diaspore in a vacuum to an elevated temperature of about 300–1000° C. The new transition alumina has increased surface area compared with alpha-alumina formed by heating diaspore in air.

5 Claims, 3 Drawing Sheets

TRANSITION ALUMINA AND METHOD FOR ITS PRODUCTION

FIELD OF THE INVENTION

The present invention relates to a new transition alumina formed in the transformation of diaspore (beta alumina monohydrate) to corundum (alpha alumina).

BACKGROUND OF THE INVENTION

Researchers have devoted considerable effort to developing processes for converting boehmite to alpha alumina. Boehmite is a metastable oxyhydride which is readily obtained by the partial dehydration of gibbsite or alumina gel, the latter being a pseudoboehmite. The dehydration of boehmite proceeds through a series of transition aluminas before finally being converted to alpha alumina.

In contrast with the stepwise conversion of boehmite to alpha alumina at temperatures above 1000° C., diaspore converts directly to alpha alumina at low temperatures (about 400–500° C.). This low temperature conversion is accomplished by a topotactic transition from diaspore to corundum which eliminates formation of the transitional aluminas. Deflandre in 1932 was first to report that diaspore is transformed to corundum by heating in air to a temperature of about 450–600° C. However, natural deposits of diaspore are relatively scarce, and the natural material is impure.

We have found that when substantially pure diaspore is heated to an elevated temperature in a vacuum, a new transition alumina is formed. Further heating of the transition alumina in air produces alpha alumina having increased surface area compared with alpha alumina formed directly by heating diaspore in air.

Processes for producing high surface area alpha aluminas are known in the prior art. For example, Siegel et al U.S. Pat. No. 5,128,081 discloses a method of producing aluminum oxide nanocrystalline ceramic material. The material is formed by oxidizing condensed aluminum powder at an elevated temperature of about 1000° C.

Mitchell U.S. Pat. No. 4,012,337 discloses a process for making high surface area alpha aluminas. The starting material is Missouri grey diaspore, a relatively impure form of diaspore (beta alumina monohydrate). The diaspore is heat treated at temperatures ranging from about 300° to 600° C. while maintaining the ambient water vapor pressure at less than about $10^{-1}$ torr, and preferably about $10^{-1}$ torr or lower.

Mitchell reported producing alpha alumina having a surface area as high as 168 m$^2$/g. The x-ray diffraction pattern reported in Example 1 of U.S. Pat. No. 4,012,337 is consistent with an alpha alumina product.

As used herein, the term "alumina hydrate" refers to hydrated alumina oxide, or $Al_2O_3 \cdot xH_2O$ wherein x varies between about 0.5 and 3. The term "diaspore" refers to beta alumina monohydrate, or $Al_2O_3 \cdot H_2O$. The term "substantially pure diaspore" refers to diaspore having a purity of at least about 90 wt. %.

A principal objective of the present invention is to provide a new transition alumina formed in the transition from diaspore to alpha alumina.

A related objective of the invention is to provide a method for making the new transition alumina.

A further objective of the present invention is to provide a method for making alpha alumina having high purity and increased surface area.

Additional objectives and advantages of the present invention will occur to persons skilled in the art from the following detailed description of our invention.

SUMMARY OF THE INVENTION

In accordance with the present invention, there is provided a method for making a transition alumina. Broadly, the invention comprises heating substantially pure diaspore in a vacuum to an elevated temperature of about 300° to 1000° C. The heating step is carried out for sufficient time to convert substantially all of the diaspore to the transition alumina.

The diaspore must contain less than about 10 wt. % impurities, preferably less than about 5 wt. %. More preferably, the diaspore contains at least about 98 wt. % beta alumina monohydrate. The starting material comprises particles having an average size of about 1–100 microns, preferably about 1–20 microns. Average surface area is less than about 1 m$^2$/g.

The diaspore particles are preferably heated to an elevated temperature of about 400° to 600° C. A particularly preferred temperature is about 500° C. A vacuum pump maintains total pressure at less than about 1 torr, more preferably less than about $10^{-3}$ torr. A vacuum of about $10^{-5}$ torr was found suitable in a preferred embodiment.

The transition alumina will have a surface area greater than about 20 m$^2$/g. A surface area of about 98 m$^2$/g was obtained in one particularly preferred sample.

DETAILED DESCRIPTION OF A PREFERRED EMBODIMENT

A starting material used in practicing the method of the present invention is an unmilled diaspore having an average particle size of about 1–20 microns and surface area of less than 1 m$^2$/g. The unmilled diaspore contains approximately 99.5 to 99.75 wt. % $Al_2O_3$ (anhydrous basis), remainder various impurities.

When the diaspore particles were heated in air at temperatures ranging from 425°–900° C., alpha alumina was produced in every case.

The diaspore particles were also heated in a vacuum ($10^{-5}$ torr) for 138 hours at 400° C. The resulting product was a transition alumina having a surface area of 97.7 m$^2$/g, 0.19 cc/g pore volume and an average pore size of 79Å. Average crystal size was 97Å.

Phase identification was done on the aluminas discussed below using a Siemens-Allis Diffractometer, copper radiation and a scanning speed of 2°/20 min. High temperature X-ray diffraction was done using a Ragakau Diffractometer and high temperature attachment in both a vacuum and air environment.

Figure 1:
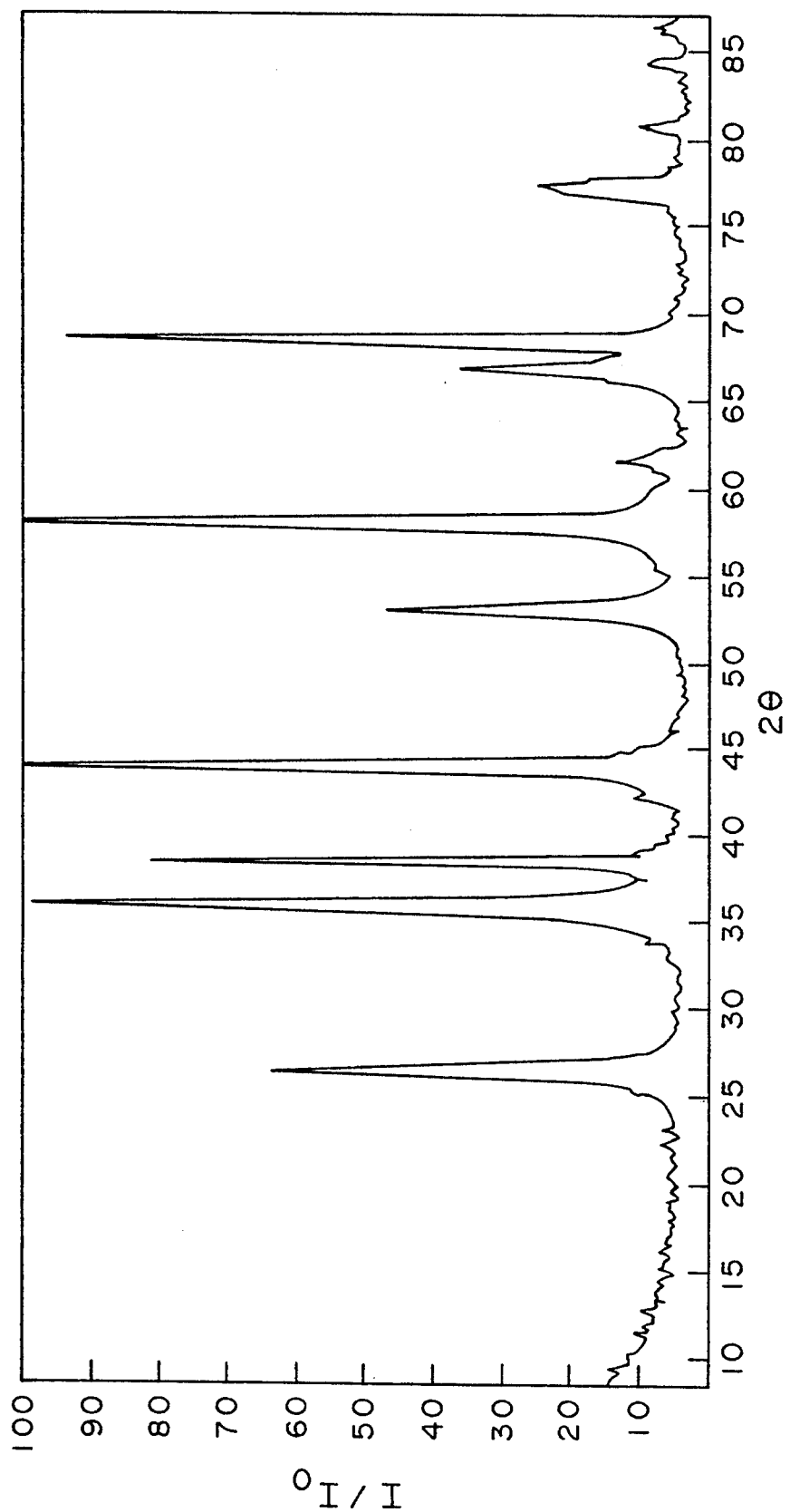
FIG. 1 is an X-ray diffraction pattern of the product formed by heating diaspore in air.
Figure 2:
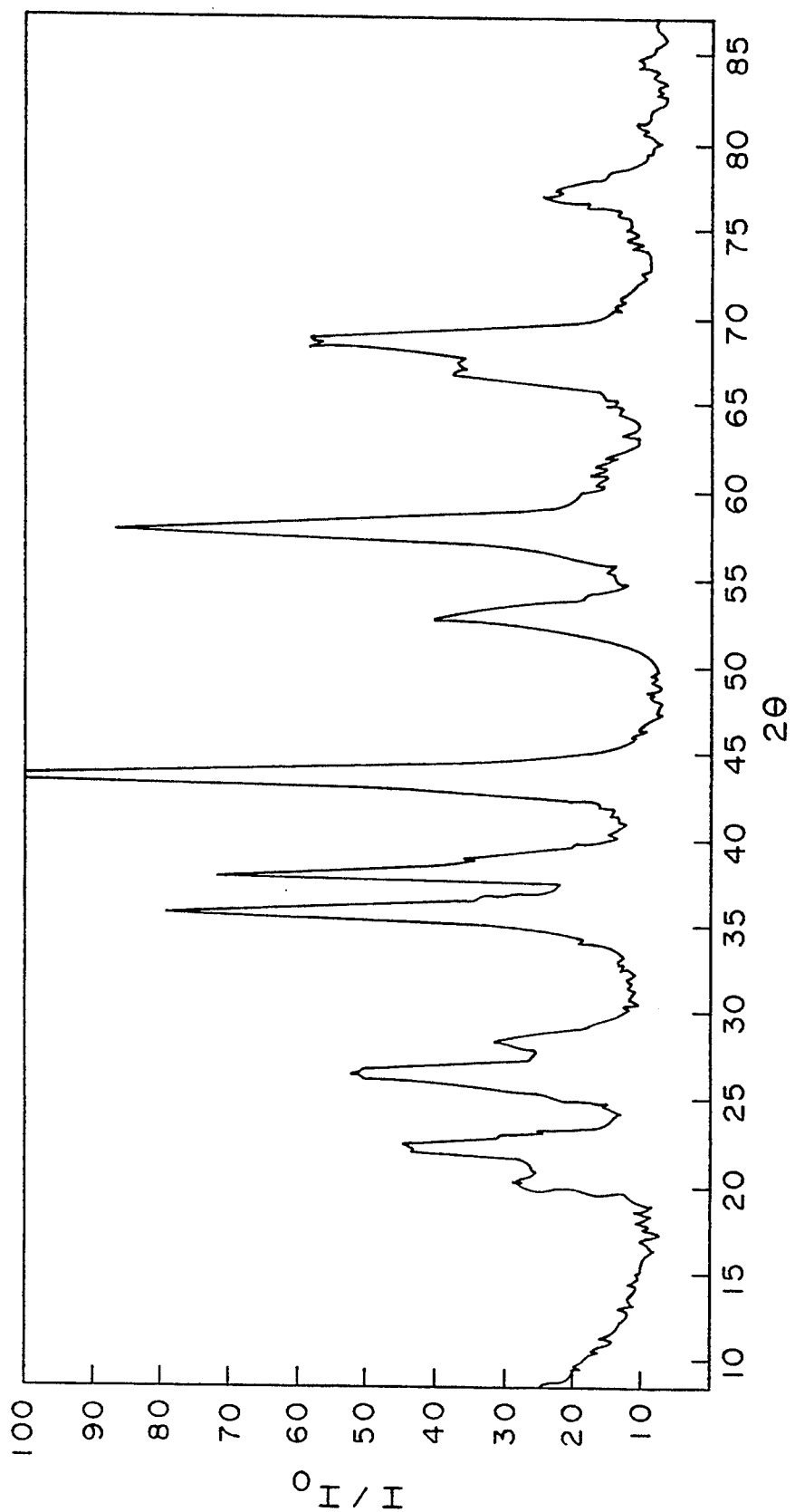
FIG. 2 is an X-ray diffraction pattern of the new transition alumina of the present invention.

Referring now to FIG. 1, there is shown an X-ray diffractogram of diaspore heated in air. When heated in air, the diaspore converts as expected to alpha alumina without any trace of transitional aluminas. FIG. 2 is an X-ray diffractogram of diaspore dehydration products formed in vacuo at the same temperature as used in FIG. 1. This Figure shows X-ray lines additional to those of alpha alumina, demonstrating an intermediate species between diaspore and alpha alumina. The additional lines and the lines corresponding to alpha alumina are all broadened relative to the alpha alumina lines formed when a diaspore is heated in air.

This new transitional alumina exists for very long times (several days) under evacuated conditions. Subsequent calcination in air of the transition alumina shows complete transformation to alpha alumina. The transformation from transition alumina to alpha alumina under vacuum was also observed at a higher temperature (800° C.) with an increase in X-ray line broadening of the alpha alumina relative to lines obtained in air at that temperature.

As shown in Table 1, the powder pattern of the transition alumina was indexed on a hexagonal cell with 2a and 2c of the hexagonal cell of alpha alumina.

TABLE 1

| X-ray Data for Transition Alumina | | | | |
|---|---|---|---|---|
| H | K | L | $d_o$ | $d_c$ |
| 1 | 1 | 2 | 4.497 | 4.491 |
| 1 | 1 | 3 | 4.172 | 4.190 |
| 2 | 0 | 4 | 3.488 | 3.494 |
| 0 | 0 | 8 | 3.249 | 3.271 |
| 2 | 0 | 8 | 2.557 | 2.560 |
| 2 | 2 | 0 | 2.383 | 2.381 |
| 3 | 0 | 6 | 2.321 | 2.324 |
| 2 | 2 | 6 | 2.090 | 2.089 |
| 0 | 4 | 8 | 1.745 | 1.741 |
| 0 | 0 | 16 | 1.631 | 1.630 |
| 2 | 2 | 12 | 1.607 | 1.604 |
| 2 | 4 | 8 | 1.402 | 1.404 |
| 0 | 6 | 0 | 1.372 | 1.372 |
| 2 | 0 | 20 | 1.242 | 1.242 |

$a = 9.4860$Å (0.0109)
$c = 26.0130$Å (0.0265)

Samples of the transition alumina were also observed by transmission electron microscopy (TEM). Powder samples composed primarily of the transitional phase were initially dispersed in a solution of pH 4.00 by ultrasonic agitation. Droplets of this solution were deposited onto 3mm copper grids that had previously been partially covered with a thin layer of carbon. After drying, well-separated particles were distributed across the carbon film. Some samples were also prepared simply by dipping a carbon-coated grid into the dry powder and shaking off excess material. The samples were examined in a Philips EM 420T electron microscope at an accelerating voltage of 120 kV.

In order to locate transition alumina particles and distinguish them from alpha alumina particles, selected area-diffraction patterns were first obtained. Rings attributable to the alpha phase (many of which overlap with transition alumina reflections) were evident. Additional spots corresponding to larger interplanar spacings than any present in alpha alumina were also observed. By examining dark-field images corresponding to the reflections inside the first alpha ring, the transition alumina particles responsible for these reflections were identified and further examined individually by microdiffraction.

Upon observation of a number of particles by TEM, information was compiled about observed interplanar spacings for comparison with the X-ray data. Table 2 lists our findings. Although the TEM studies were not exhaustive, transmission electron diffraction patterns exhibited several d-spacings that were not attributable to either the alpha phase or the diaspore but were consistent with a doubling of the alpha alumina axes. Some of these were clearly observed in the X-ray spectra while others were weak or difficult to observe because of proximity to other peaks.

Some of the larger observed interplanar spacings, and corresponding calculated spacings that are within 2% of the measured values, are shown in Table 2. The most probably assignment(s) are in boldface. The absence of the strong diaspore (110) reflection at 3.987Å indicates that little or no diaspore remains in the sample. All observed reflections are attributable to a nominal transition alumina unit cell (hexagonal, $a_0=9.49$Å, $c_0=26.01$Å) based on nearly doubled axes with respect to $\alpha$-Al$_2$O$_3$, or to $\alpha$ itself (the peaks of which would overlap with those of the transition alumina.). The remaining higher-angle peaks in the X-ray diffractometer scan were also consistent with the presence of only transition alumina and possible $\alpha$-Al$_2$O$_3$. Units in Å; planar indices as indicated.

TABLE 2

| XRD | TEM | Diaspore (AlOOH)[1] | $\alpha$-Al$_2$O$_3$[2] | Transition Alumina |
|---|---|---|---|---|
| — | 5.06 | — | — | 5.099 (10$\bar{1}$4) |
| — | 4.74–4.80 | 4.710 (020) | — | 4.745 (10$\bar{2}$0) |
| 4.497 | — | — | — | 4.458 (11$\bar{2}$2) |
| 4.172 | 4.15–4.19 | — | 4.122 (10$\bar{1}$0) | 4.162 (11$\bar{2}$3) |
|  |  |  |  | 4.109 (20$\bar{2}$0) |
| 3.488 | — | — | 3.480 (10$\bar{1}$2) | 3.474 (22$\bar{0}$4) |
|  |  |  |  | 4.109 (11$\bar{2}$5) |

[1]W. R. Busing and H. A. Levy, Acta Cryst. 11,798 (1958).
[2]R. E. Newnham and Y. M Haan, Zeit. Krist. 117,235 (1962).

Microdiffraction from individual particles confirmed that the atomic structure of the transitional alumina was closely related to that of $\alpha$-Al$_2$O$_3$, with the simplest explanation of the spot pattern being that the transition phase has a doubling of the repeat distance (lattice translation vector) along the a and b axes compared with the $\alpha$ phase, but that the resulting atomic arrangement results in loss of the three-fold axis in the space group and a consequent lowering of the crystal symmetry, possibly to orthorhombic. An additional microdiffraction pattern also gave spacings and angles consistent with those of a double-unit-cell phase.

Aluminum-27 NMR spectra for an $\alpha$-Al$_2$O$_3$ derived from the transition alumina consists of a large symmetrical resonance at 9.5 ppm due to octahedrally coordinated aluminum (consistent with alpha alumina) and a much smaller resonance at approximately 65 ppm due to tetrahedrally coordinated aluminum. The tetrahedral aluminum accounts for approximately <0.5% of the total area of the spectrum. The spectrum for the transition alumina is similar except that the tetrahedral resonance has increased in relative area by a factor of about 20. The tetrahedral resonance accounts for approximately 10.5% of the total area of the spectrum. In addition to this increase in tetrahedral aluminum, a slight tailing of the octahedral aluminum resonance (located at approximately 9 ppm) to highfield was observed. This tailing may reflect the influence of tetrahedrally coordinate aluminum located in the outer coordination spheres of octahedrally coordinated aluminum on the octahedral aluminum resonance.

A comparative test was performed to determine the effect of heating Missouri grey diaspore in a vacuum. Cristy Minerals Company of High Hill, Missouri, supplied a sample of the grey diaspore. Nominal chemical analysis on a dry basis is as follows: 70.10 wt. % $Al_2O_3$, 20.74 wt. % $SiO_2$, 3.43 wt. % $TiO_2$, 2.07 wt. % $K_2O$, 1.07 wt. % $Fe_2O_3$, 0.32 wt. % CaO, 0.29 wt. % MgO and 0.08 wt. % $Na_2O$.

Figure 3:
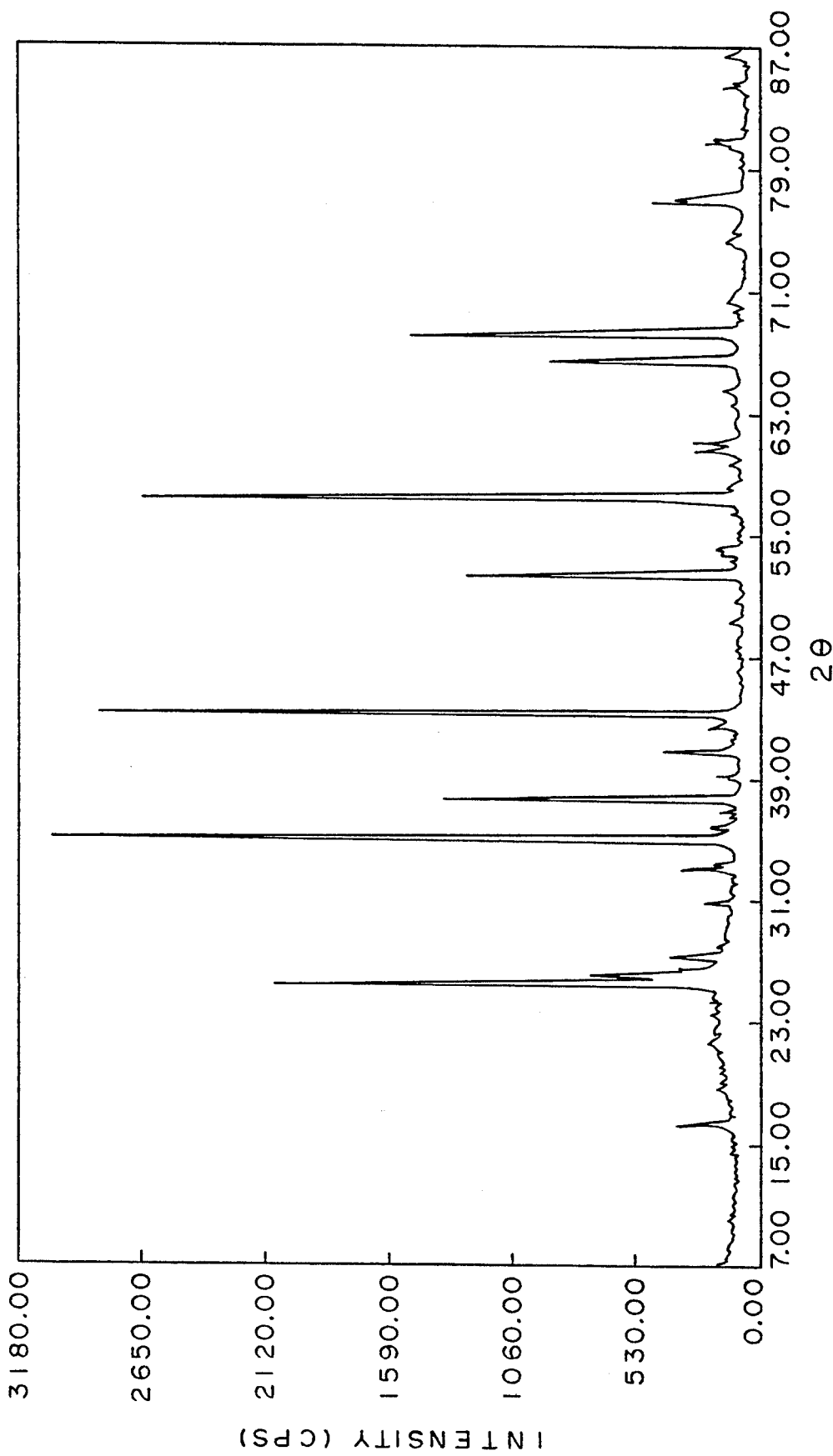
FIG. 3 is an X-ray diffraction patern of the product formed by heating Missouri grey diaspore in a vacuum.

The grey diaspore was heated in a vacuum ($10^{-5}$ torr) at 400° C. for 138 hours and then cooled. The X-ray diffraction pattern (FIG. 3) shows major amounts of alpha-alumina and mullite and a minor mount of rutile. None of the transition alumina of the present invention was detected. This test demonstrates that calcination of impure diaspore does not form our new transition alumina under the process conditions that we employ.

Having thus described the invention, what is claimed is:

1. A transition alumina having an x-ray diffraction pattern essentially as shown in Table 1.
2. The transition alumina of claim 1 having an average particle size of about 1–20 microns.
3. The transition alumina of claim 1 having a surface area of greater than about 20 $m^2/g$.
4. The transition alumina of claim 1 comprising at least about 99 wt % alumina monohydrate.
5. A transition alumina having an x-ray diffraction pattern as shown in Table 1.

* * * * *